United States Patent
Brogårdh et al.

(10) Patent No.: US 10,272,571 B2
(45) Date of Patent: Apr. 30, 2019

(54) DETERMINING A CALIBRATION POSITION OF A ROBOT JOINT

(71) Applicant: ABB Schweiz AG, Baden (CH)

(72) Inventors: Torgny Brogårdh, Västerås (SE); Peter Fixell, Västerås (SE); Görgen Johansson, Västerås (SE); Hans Andersson, Västerås (SE); Sven Hanssen, Västerås (SE); Stig Moberg, Västerås (SE); Siim Viilup, Västerås (SE); Mats Olsson, Västerås (SE)

(73) Assignee: ABB Schweiz AG, Baden (CH)

( * ) Notice: Subject to any disclaimer, the term of this patent is extended or adjusted under 35 U.S.C. 154(b) by 218 days.

(21) Appl. No.: 15/524,992

(22) PCT Filed: Nov. 12, 2014

(86) PCT No.: PCT/EP2014/074329
§ 371 (c)(1),
(2) Date: May 5, 2017

(87) PCT Pub. No.: WO2016/074708
PCT Pub. Date: May 19, 2016

(65) Prior Publication Data
US 2018/0117768 A1    May 3, 2018

(51) Int. Cl.
*G01C 21/00* (2006.01)
*B25J 9/16* (2006.01)
*B25J 17/00* (2006.01)

(52) U.S. Cl.
CPC ............ *B25J 9/1692* (2013.01); *B25J 17/00* (2013.01); *G05B 2219/39018* (2013.01);
(Continued)

(58) Field of Classification Search
CPC ....... B25J 9/1692; B25J 17/00; Y10S 901/28; Y10S 901/25; Y10S 901/15; Y10S 901/02; G05B 2219/39027; G05B 2219/39018
See application file for complete search history.

(56) References Cited

U.S. PATENT DOCUMENTS

| | | |
|---|---|---|
| 5,086,641 A | 2/1992 | Roselli |
| 5,418,890 A | 5/1995 | Ishihara et al. |

(Continued)

FOREIGN PATENT DOCUMENTS

| | | |
|---|---|---|
| JP | 60211505 | 10/1985 |
| JP | 623306 A | 9/1987 |

(Continued)

OTHER PUBLICATIONS

International Preliminary Report on Patentability Application No. PCT/EP2014/074329 Completed Date: Dec. 12, 2016 9 Pages.

(Continued)

*Primary Examiner* — Ian Jen
(74) *Attorney, Agent, or Firm* — Whitmyer IP Group LLC (57) ABSTRACT

An arrangement for determining the calibration position of a robot joint where the joint has a moveable joint element and a stationary joint element, where one of the joint elements has a holding structure and the other a force providing protrusion, a robot controller, a motor connected between the robot controller and the moveable joint element and a force receiving element adapted to form a kinematic coupling with the holding structure and the force providing protrusion, where the kinematic coupling has at least two areas of contact between the structure and the force receiving element and one area of contact between the force providing protrusion and the force receiving element, the force receiving element being fastenable to the holding structure for stretching out across a gap between the two (Continued)

robot joint elements for receiving a force from the force providing protrusion.

17 Claims, 9 Drawing Sheets

(52) U.S. Cl.
CPC ... *G05B 2219/39027* (2013.01); *Y10S 901/02* (2013.01); *Y10S 901/15* (2013.01); *Y10S 901/25* (2013.01); *Y10S 901/28* (2013.01)

(56) References Cited

U.S. PATENT DOCUMENTS

| | | |
|---|---|---|
| 7,566,198 B2 | 7/2009 | Yazawa et al. |
| 2014/0222352 A1* | 8/2014 | Sander-Tavallaey ........................ B25J 9/1674 702/35 |
| 2018/0117768 A1* | 5/2018 | Brogrdh ............... B25J 9/1692 |
| 2018/0257246 A1* | 9/2018 | Olsson .................. B25J 9/0051 |

FOREIGN PATENT DOCUMENTS

| | | |
|---|---|---|
| JP | 2010089213 A | 4/2010 |
| WO | 2010060484 A1 | 6/2010 |

OTHER PUBLICATIONS

International Search Report & Written Opinion Application No. PCT/EP2014/074329 Completed Date: Sep. 18, 2015; dated Oct. 1, 2015 11 Pages.

* cited by examiner

DETERMINING A CALIBRATION POSITION OF A ROBOT JOINT

TECHNICAL FIELD

The present invention relates to the field of robots. The invention more particularly relates to an arrangement and a method for determining the calibration position of a robot joint.

BACKGROUND

An industrial robot is typically formed as an arm comprising a number of joints, where a joint has a movable element being moved by an actuator, such as a motor connected to a gear, in relation to a stationary element. The movable element may thereby be moveable in relation to the stationary element, such as through an angular or linear movement.

One important feature of a robot is the accuracy of the control. The movements of the various joints of a robot have to be made within well defined tolerances. In order to do this it is necessary to calibrate at least one of the joints from time to time with a well-defined calibration position. Calibration may especially be needed after a maintenance operation, for instance after an exchange of a motor or measurement system.

In order to perform the calibration, the calibration position must then first be found.

In the prior art there are some schemes used for detecting positions of robot joints.

U.S. Pat. No. 5,418,890 discloses a system where an angle is determined when a round bar comes into contact with a round hole.

JPS 60-211505 discloses a sensor that determines an angle based on detecting the change of diameter of a rotating wheel.

A similar idea is disclosed in U.S. Pat. No. 7,566,198. Here sensors are used for detecting changes in the exterior of a rotary member for determining homing angles.

However, there is in view of these documents still room for improvement. The present invention is therefore directed towards the problem of finding a calibration position to be used for calibrating a robot joint.

SUMMARY

The present invention is thus directed towards finding a calibration position to be used for calibrating a robot joint.

This object is according to a first aspect of the present invention achieved through an arrangement for determining the calibration position of a robot joint and comprising:
the joint, comprising a moveable joint element and a stationary joint element, where one of the joint elements comprises a holding structure and the other a force providing protrusion,
a robot controller,
a motor connected between the robot controller and the moveable joint element, and
a force receiving element adapted to form a kinematic coupling with the holding structure and the force providing protrusion, the kinematic coupling having at least two areas of contact between the holding structure and the force receiving element and one area of contact between the force providing protrusion and the force receiving element, the force receiving element being fastenable to said holding structure for stretching out across a gap between the two robot joint elements for receiving a force from the force providing protrusion.

The object is according to a second aspect achieved through a method for determining the calibration position of a robot joint comprising a moveable joint element and a stationary joint element, one of the robot joint elements comprising a holding structure fastened to a force receiving element stretching out across a gap between the two robot joint elements and the other comprising a force providing protrusion for providing a force on the force receiving element, the force receiving element being adapted to form a kinematic coupling with the holding structure and the force providing protrusion, the kinematic coupling having at least two areas of contact between the holding structure and the force receiving element and one area of contact between the force providing protrusion and the force receiving element, the method being performed by a calibration control element using a robot controller and a motor connected between the robot controller and the moveable joint element, the method comprising the steps of:
providing a movement command;
obtaining measurements relating to positions of the moveable joint element;
obtaining an indication of the force providing protrusion contacting the force receiving element; and
determining the calibration position based on a position of the moveable joint element that coincides with the indication.

The present invention has many advantages. It allows an accurate calibration position to be determined with a limited set of additional elements than those already used in the control. The invention allows the calibration position to be determined at high precision using simple mechanical arrangements, which in turn reduces the cost for the calibration equipment installed in the robot. It is also possible that the added equipment is only used during the calibration.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:
FIG. 1 schematically shows a robot cell comprising a robot and a robot controller,
FIG. 2 schematically shows a joint of the robot with a gear box and a motor,
FIG. 3 schematically shows some units of the robot controller together with the motor, two gear box parts and a moveable and stationary joint element as well as objects forming a kinematic coupling,
FIG. 4 schematically shows a holding structure, which is one of the kinematic coupling forming objects,
FIGS. 5A and 5B schematically show the objects forming the kinematic coupling in relation to the two joint elements before and after a force providing protrusion is in contact with a force receiving element.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
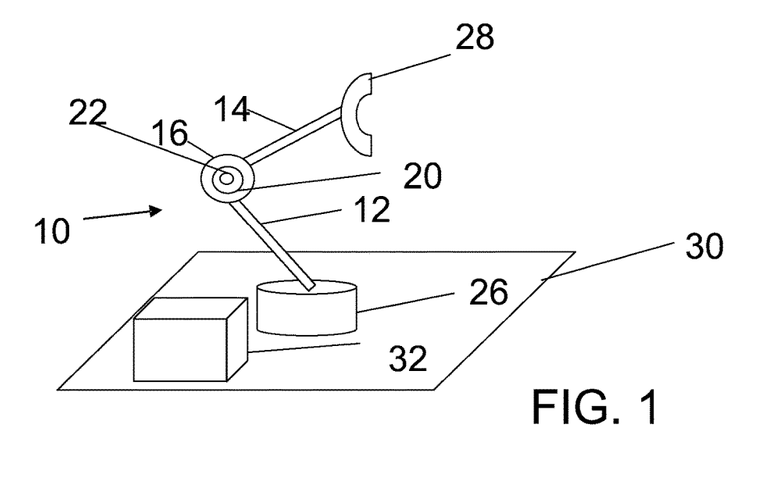

FIG. 1 schematically shows a robot cell 30 comprising an industrial robot 10 and a robot controller 32. The robot 10 comprises a number of arm sections 12, 14 connected to each other via joints 16. The robot 10 shown in FIG. 1 is simplified and therefore only two arm sections are shown; a first and a second arm section 12 and 14, connected to each other via a joint. This means that in this example only one joint 16, which joins the first and second arm sections 12 and 14, is shown. It should however be realized that a robot normally comprises many more arm sections, typically six and consequently also several more joints, which joints may all be controlled.

The first arm section 12 is here connected to a foundation 26. In this way the robot 10 is attached to the foundation 26. There is normally also a joint joining the first arm section 12 to this foundation 26 for allowing the first arm section 12 to be moved in relation to the foundation 26. Thereby the foundation may provide a first axis of rotation of the joint. However, this joint has been omitted from FIG. 1 for the sake of clarity. The robot normally comprises a tool holder for allowing a tool to be connected to the robot 10. Such a tool is typically connected to the outermost arm section of the robot, i.e. to the arm section furthest away from the foundation 26. Consequently, in FIG. 1 one such tool 28 is shown as being attached to the second arm section 14.

In order to move the second arm section 14 in relation to the first arm section 12 there is provided an actuator 22 at the joint 16, which actuator may be implemented as a motor 22, with advantage a servo motor, for moving the second arm around a second axis of rotation defined by the joint 16. Between this actuator and the joint 16 there is furthermore provided a gear box 20.

In some variations it is also possible that there is one or more sensors connected to the motor 22 or the gear box. Such a sensor could be provided for sensing the position of the joint 16.

Figure 2:
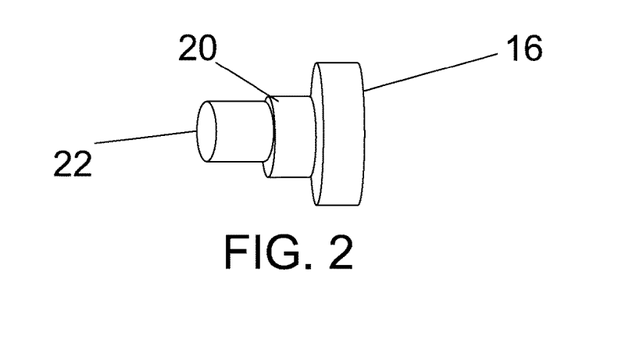

The joint 16, with motor 22 and gear box 20 is also schematically shown in FIG. 2, which figure shows a perspective view of these elements.

Figure 3:
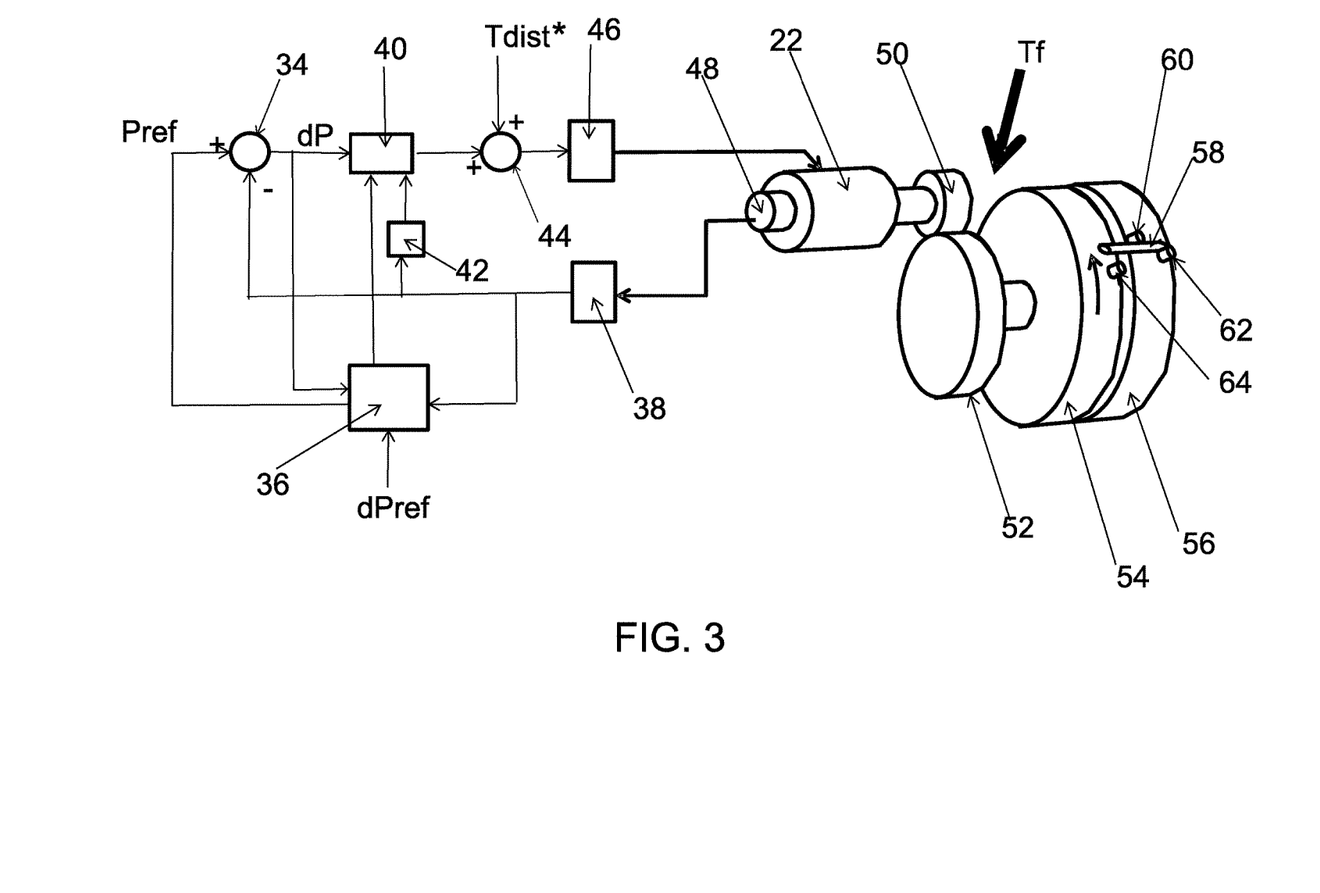

A combined block schematic and perspective view of a calibration position determining arrangement or arrangement for determining the calibration position of a robot joint according to a first embodiment is shown in FIG. 3.

This arrangement is provided in relation to the previously mentioned second joint 16.

The arrangement comprises various joint motor and gear box elements as well as elements of the robot controller. The elements of the robot controller are here shown as blocks, where the other elements are shown as physical objects in a perspective view.

In the robot controller 32 there is a subtracting element 34, having a first input connected to a first output of a calibration control element 36 for receiving a signal Pref. The subtracting element 34 also has a second input connected to an output of a sensor handling element 38. It also has an output connected to a first input of a servo element 40 for providing a signal dP to this servo element 40. The servo element 40 also has a second input connected to a second output of the calibration control element 36. The servo element 40 also has a third input connected to an output of a derivate calculating element 42. An input of the derivative calculating element 42 is also connected to the output of the sensor handling element 38.

The output of the sensor handling element 38 is also connected to a first input of the calibration control element 36, and the output of the subtracting element 34 is connected to a second input of the calibration control element 36. The calibration control element 36 also has a third input on which it receives a signal dPref.

The servo element 40 has an output connected to a first input of an adding element 44, which has a second input on which it receives a signal Tdist*. The adding element 44 has an output connected to the input of a motor drive element 46 which in turn supplies a drive signal to the motor 22. The motor 22 is also equipped with an angle measurement sensor 48 connected to the sensor handling element 38. The angle measurement sensor 48 may be an encoder or resolver and the sensor handling element 38 may comprise the measurement electronics needed to obtain the motor angle as well as motor speed data from motor angle measurements.

The motor 22 is used for moving a moveable joint element 54, which in this example is shaped as a moveable disc. In order to enable a wide range of speeds, the motor 22 is connected to this movable joint element 54 via the gear box. In this example the gear box comprises a first and a second gear train element 50 and 52, where the first gear train element 50 is connected to the motor 22 and the second gear box element 52 is connected to the moveable joint element 54. The first gear train element 50 interacts with the second gear train element 52 in order to move the movable joint element 54. It can thereby be seen that the motor 22 is connected between the robot controller and the moveable joint element 54. It can be seen that as the motor 22 acts on the moveable joint element 54, the motor angle relates or corresponds to the angle of the moveable joint element 54.

There is also a static joint element 56, which may also be formed as a disc that is coaxial with the disc forming the moveable joint element 54. The motor angle and the angle of the moveable joint element are examples of positions of the moveable joint element obtained in relation to the static joint element.

As can be seen in FIG. 3, there are further objects provided in relation to the static and movable joint elements 56 and 54. The static joint element 56 in this case comprises a force receiving element 58 fastened to it via a holding structure. In this first embodiment the holding structure comprises a first and a second holding protrusions 60 and 62, which are protrusions extending from the surface of the static joint element 56 in order to fasten the force receiving element 58. In the case of a disc, they may protrude radially out from the side or circumference of the disc. They are furthermore separated from each other both radially as well as circumferentially, i.e. along the width of the disc circumference or disc side, in order to hold opposite sides of the force receiving element 58. When a calibration position is to be determined, the force receiving element 58 is supposed to stretch out from the side or circumference of the static joint element 56 across a gap and over the side or circumference of the moveable joint element 54. The moveable joint element 54 is provided with a force providing protrusion 64, which with advantage stretches out radially from the side of the moveable joint element 54. The force providing protrusion 64 is in this case located on the side of the disc such that it will contact the force receiving element 58 in case the moveable joint element 54 is moved.

The force receiving element 58 is precisely machined and has well-defined geometry. It may with advantage be formed as a cylinder, where the cylinder axis or longitudinal axis is parallel with the axis of rotation of the joint, which is the axis of rotation around which the moveable joint element 54 rotates. All force receiving elements must be manufactured with exactly the same dimensions and accurate cylindrical shape. Also the holding protrusions 60 and 62 and force providing protrusion 64 may generally be formed as solid cylinders or bars. However, in these cases the cylinder axis is perpendicular to the axis of rotation and more particularly extend radially out from the disc circumference or disc side of the corresponding joint element.

The force receiving element 58 is adapted to form a kinematic coupling having at least two areas of contact with the holding structure and one area of contact with the force providing protrusion 64. In this first embodiment there are four areas of contact, where each area is provided as a point. Thus the force providing protrusion 64, the force receiving element 58 and the two holding protrusions 60 and 62 together form a kinematic coupling with five points of contact between the force receiving element 58 and the various protrusions 60, 62 and 64. Thereby, the kinematic coupling contains four degrees of freedom of the force receiving element with the unconstrained degrees of freedom being rotation around the longitudinal axis of the cylindrical force receiving element and translational movement of the force receiving element. The force providing protrusion 64 in this case provides one point of contact and the holding protrusions 60 and 62 each provide two adjacent points of contact. The points of contact of a holding protrusion are in this case provided in groups of two adjacent points.

The holding protrusions 60 and 62 can be of any well defined shape for precision point contact with the force receiving element 58.

It is clear that as both the force receiving element 58 and force providing protrusion 64 are formed as solid cylinders or bars with cylinder axes or longitudinal axes that are perpendicular to each other, there will only be one point of contact between them. However, in order to provide two points of contact between a holding protrusion 60 or 62 and the force receiving element 58 something has to be done with either the holding protrusion or with the force receiving element. In this embodiment the holding protrusion has been modified. The holding protrusion does in this case have a V-shaped slit in the circumference or side, which is schematically shown for the second holding protrusion 62 in FIG. 4. The distance variation between the two legs of the V may in this case be provided in a plane perpendicular to the plane of the end surface of the second holding protrusion 62. In this way there are provided two points of contact between the second holding protrusion 62 and the force receiving element 58, which two points of contact are provided on the same side of the force receiving element 58 but laterally displaced from each other in a plane perpendicular to the cylinder axis or longitudinal axis of the force receiving element 58. Thereby the two holding protrusions 60, 62 are placed on opposite sides of the longitudinal axis through the cylinder body of the force receiving element 58, where each holding protrusion 60 and 62 provides two laterally separated points of contact in relation to the longitudinal axis.

Figure 4:
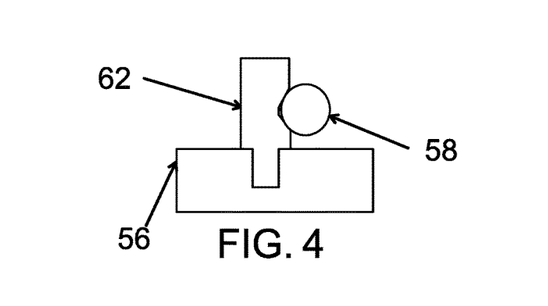

Each holding protrusion 60 and 62 in this way provides a group of adjacent points of contact, where each group comprises two points. However, the two points of the groups of the two holding protrusions 60 and 62 are provided on opposite sides of the cylinder axis of the force receiving element 58. In this way the four points will securely hold the force receiving element 58 in relation to contacting made by the force providing element 64.

It can also be seen that as the force receiving element 58 is held by the holding protrusions 60 and 62 and stretches out across the gap between the two robot joint elements 54 and 56, it may receive a force from the force providing protrusion 64. This force is used for determining the calibration angle.

The way the first embodiment operates will now be described with reference being made to FIGS. 5a and 5b, which schematically show the holding protrusions 60 and 62 on the side or edge of the stationary joint element 56 holding the force receiving element 58, when the force providing protrusion 64 provided on the side or edge of the movable joint element 54 is moved into contact with the force receiving element 58, and to FIG. 6, which shows a flow chart of method steps in a method for determining the calibration position.

Figure 5A:
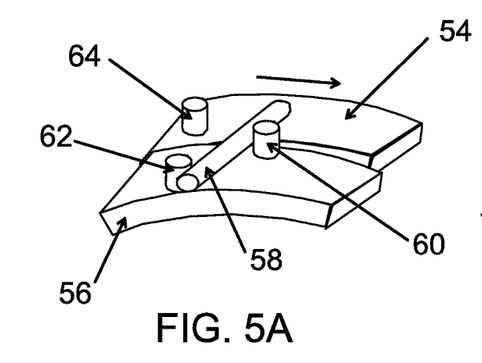
Figure 5B:
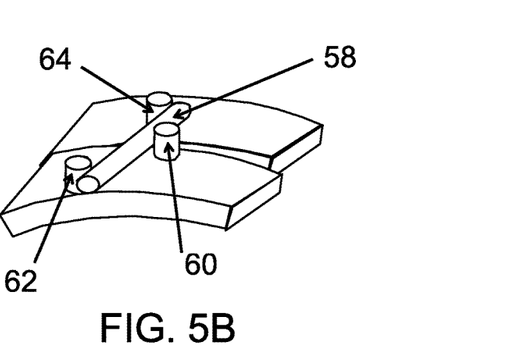
Figure 6:
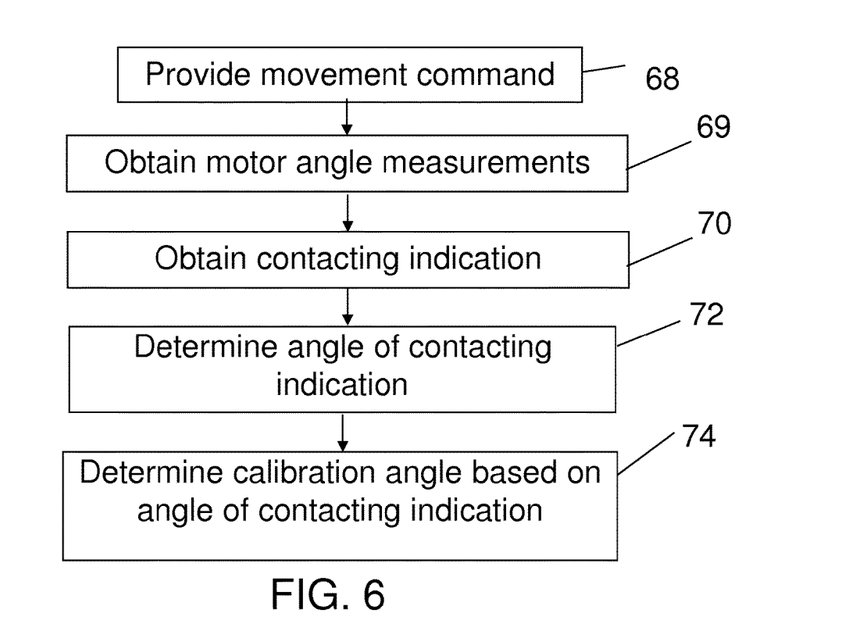
FIG. 6 shows a number of method steps being performed in a method for determining the calibration position according to a first embodiment, FIG. 7A-7D schematically show the joint and force receiving element as well as the holding and force proving protrusions during different steps of the calibration.

As can be seen in FIGS. 5a and 5b, the force receiving element 58 may be a high precision mechanical stop, which is mounted between the joint elements 56 and 54, in the figure in the form of a solid cylinder or rod which will be clamped between the protrusions 60, 62 and 64, which may likewise be solid cylinders or rods.

When determining the calibration angle, the robot controller 32 is used.

The servo element 40 of the robot controller 32 typically comprises a proportional control block in parallel with an integrating control block and can be switched into a compliant control mode. The servo element 40 acts on a difference dP between an angle reference Pref and a measured angle Pmeas of the motor 22 as detected by the sensor 48. This difference is processed and the result of the processing supplied to the adding element 44 for generating a torque reference TR used to drive the motor 22. In the compliant control mode the integrating control is disabled, while the proportional control is performed with a low proportional control factor k. The processing performed by the servo element 40 then comprises multiplying the difference dP with the proportional control factor.

The torque of the motor 22 is controlled by the drive element 46, the input of which is the torque reference TR. The torque reference is the sum, in the adding element 44, of a calculated disturbance torque Tdist* and the output k*dP from the servo element 40. Tdist* includes a gravity torque and a friction torque. The gravity torque could either be calculated from a multibody dynamic rigid body model of the robot 10 or could be obtained from a memory, in which the integrator output was registered before the servo 40 was switched to compliant control mode. It could also be obtained from a combination of model calculated gravity and the stored integrator output. The friction torque could also be obtained from a model but since the friction Tf is temperature dependent and will change with the wear of bearings and gears, it may have to be identified before calibration in order to obtain the accuracy needed.

The motor angle measured by the sensor 48 and processed by the sensor handling element 38 is subtracted from the reference motor angle Pref and is also used by the derivative calculating element 42 to obtain the speed to the servo element 40. A calibration sequence is controlled by the calibration control element 36, which determines the sequence of angle references Pref and motor angle speed. dPref is a motor angle error that may be obtained at clamping of the force receiving element 58 to generate a well defined pre-stress of the drive chain.

The calibration may be carried out in the following general way.

The calibration control element 36 provides a movement command Pref to the adding element 34, step 68. The movement command may be a command to a position which would move the force providing protrusion 64 on the moveable joint element past the force receiving element 58. This movement command will be processed in the robot controller 32 according to the above-mentioned principles, which will lead to the driving element 46 generating a drive signal to the motor 22 for moving the moveable joint element 54. As the moveable joint element 54 is moved, the calibration control element 36 will receive motor angle measurements and thereby obtain measurements relating to angles of the moveable joint element 54, step 69.

The calibration control element 36 also obtains a contacting indication, step 70, i.e. an indication that the force receiving element 58 has contact with the force providing protrusion 64. The sensor 48 provides motor angle measurements to the sensor handling element 38, which may use the motor angle measurements directly or process them. One type of processing is a speed determination. The sensor handling element 38 may therefore provide speed determinations to the calibration control element 36, which may in turn analyze these speed determinations. If, during the carrying out of the control of the motor 22 using the reference angle Pref, the calibration control element 36 determines that there is a speed decrease, then this may be an indication that the force receiving element 58 has been contacted. Such a speed decrease may thus be a contacting indication. The contacting indication may thus be generated based on a detection of change in motor speed. As an alternative or in addition it is possible to also use a determination of a change in motor torque for obtaining a contacting indication.

Thereafter the calibration control element 36 determines the angle of the contacting indication, step 72, which may be the angle at which the speed decrease is detected. Thereafter the calibration control element 36 determines the calibration angle based on the angle of the contacting indications, step 74. In the simplest variation, the calibration angle may be the angle of the contacting indication, which corresponds to an angle of the moveable joint element 54 that coincides with the contacting indication. It may in this case be an angle obtained at and referring to the same point in time. In other variations further angle measurements and processing is performed for determining the calibration angle.

One variation of the first embodiment will now be described in somewhat more detail with reference being made to FIG. 7a-d:

1. With normal position control the joint is manually jogged so that the force providing protrusion 64 is close to the force receiving element 58 for example as in FIG. 7a.

Figure 7A:
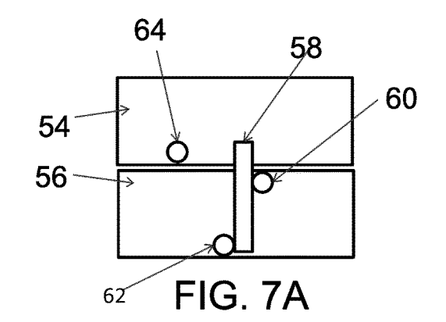

2. The operator may then order the calibration control element 36 to perform calibration of the joint. The calibration control element 36 then changes the control mode of the servo element to compliant control (impedance control with low stiffness parameter value), for example control as a spring with added speed limitation. The calibration control element 36 may then set Tdist* as the integrator value from the preceding position control mode and disconnect the integrator and the calibration control element 36 thereafter obtains an initial angle reference value Pref0, which may be stored in a memory of the calibration control element 36, as well as obtains a first angle measurement Pmeas1 from the sensor handling element 38.

3. The calibration control element 36 then changes Pref from Pref0 until the sensor handling element 38 detects a motion from the first angle measurement Pmeas1. The servo error value when this takes place, dP1=Pref1−Pref0 is optionally stored in the memory of the calibration control element 36 and corresponds to the servo error needed to overcome the static friction Tfs in the mechanical drive train.

Figure 7B:
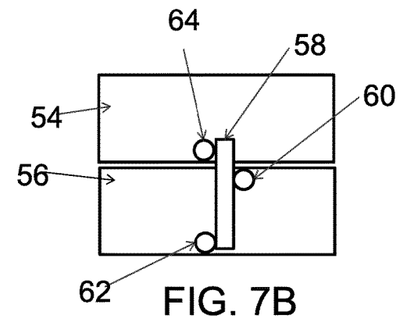

4. The calibration control element 36 then proceeds ramping Pref from Pref1 with set speed limitation in the servo element 40 until the sensor handling element 38 detects a speed drop. Then the Pref is slowly ramped in the other direction and stopped and the actual angle Pmeascoll1 from the sensor handling element 38 corresponding to this speed drop is stored in the memory of the calibration control element 36. The speed drop is here a contacting indication and Pmeascoll1 the corresponding angle. Pmeascoll1 can be used as a first approximation of the calibration angle and is in many cases accurate enough. The situation when Pmeascoll1 has been obtained is shown in FIG. 7b.

Figure 7C:
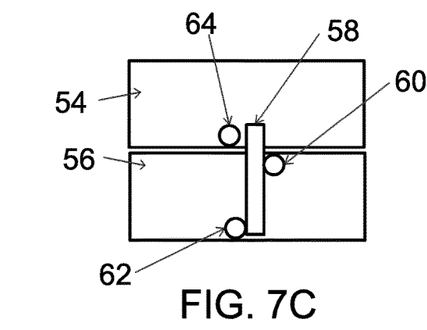

5. In order to increase the accuracy Pref may now be ramped in the opposite direction until a movement away from Pmeascoll1 is detected by the sensor handling element 38. Pref may then be rapidly changed to reduce dP whereby the movement is stopped. The angle measurement obtained from the sensor handling element 38 is now Pmeas2. FIG. 7c illustrates this situation 6. Optionally Pmeascoll1−Pmeas2 is calculated by the calibration control element 36 and if this value is >k*dPref, where k<1, then Pref is ramped until Pmeas3=Pmeascoll1−k*dPref, that is the Pmeas=Pmeas3 should be as close as possible to Pmeascoll1. FIG. 7c also shows this situation.

Figure 7D:
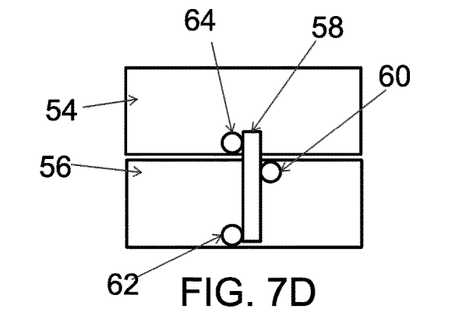

7. The calibration control element 36 now ramps Pref until the sensor handling element 38 detects a motion from Pmeas3 (alternatively Pmeas2). The ramp is then stopped (the friction is compensated for) and the predefined value dPref is added and a very low speed limit is set and the angle value Pmeascoll2 from the sensor handling element 38 when the motor stops is stored in the memory of the calibration control element 36 and used as the calibration angle. FIG. 7d illustrates the state after this has been done.

Of course there are many variants to this process. For example it is possible after the first measurements of the clamping angle Pmeascoll1 to switch to position control and then order Pmeascoll1−k*dPref and then go back to soft servo and find Pmeascoll2. To speed up the procedure it is also possible to use the servo error value dP1 directly at the later movements instead of obtaining friction compensation with new ramps in Pref.

Instead of compensating for friction by ramping Pref the friction could be identified, for example by moving the joint slowly in both directions at position control and use the half of the differences between the torque levels in the both directions as the identified friction force. The identified friction torque is then added to Tdist* at the adding element 44.

Another efficient control scheme disconnects the integrator and lowers the position control loop gain at first when contacting has been indicated. The advantage with this concept is that the movement before the contacting is better controlled. This method includes the following steps:

1. The robot joint is ordered to move at specified speed towards contacting position using position control.
2. The speed or the torque signal or a combination of these signals is used to indicate the contacting. For example the derivative of low pass filtered torque signal (TR) may be used to indicate contacting. In a more advanced mode an observer, based on a dynamic model of the joint, is used, whereby both the torque and speed signal are used to indicate the contacting.
3. As soon as the contacting is indicated by the calibration control element, it lowers the position control gain, sets the Tdist signal to the present value of the integrator and disconnects the integrator. In a special case the position control gain is set to zero. It is also possible to just set the input to the integrator to zero in order to obtain the torque feed forward signal corresponding to the friction and gravity torques at the contacting instance.
4. Calculate a feed forward torque component dTdist to add to Tdist in order to obtain a well defined torque at contact. As an alternative the speed controller gain can be changed to obtain the dTdist defined. This is made for example using the following formula:
5.

$$0.1 K_{v0} < K_v = \frac{\tau_A - \tau_I + \Delta_\tau}{V_{ref}} < 2 K_{v0}$$

where $\tau_A$ is the average torque before the indication of the contacting, $\tau_I$ is the integrator output torque, $\Delta\tau$ the desired contacting torque, $V_{ref}$ the reference speed input to the speed controller, $K_{v0}$ the gain of the speed controller before contacting indication and $K_v$ the gain of the speed controller that is to be set. If the calculated $K_v$ is lower than $0.1 \times K_{v0}$ or larger than $2 \times K_{v0}$, the calibration must be repeated.

6. Read the motor position, which will be the calibration position corresponding to Pmeascoll. The calibration position is thus in this case obtained at a static state after the obtaining of the contacting indication.

It is also in this case possible to iterate the procedure and run for example at another speed and from a position closer to the contacting position. It may also be possible to store the position for the indication of contacting in the first procedure and then at a second procedure compensate for time delays in controller and in the filters used by performing steps 3-5 known time delay before the contacting was indicated in the first procedure. In this way it will be possible to lower the built up contacting torque in the calibration position.

When building up the contacting force it is possible to obtain data about backlash and stiffness in the gear of the joint. By measuring torque and position during contacting the gear stiffness at different torque levels can be obtained. By using two holding protrusions, one on each side of the force receiving element and each having two points of contact, contacting by the force providing element can be obtained in both directions of rotation and the backlash of the joint can be measured.

Important for this concept is that the force receiving elements are removed after calibration. To make sure that this is made the robot is run with very compliant control in such a way that all the contacting positions are passed. If a force receiving element is then forgotten in a joint the robot will gently stop indicating for which joint there is still a force receiving element.

Furthermore, it is possible that the force receiving element may be retracted when calibration is no longer needed, for instance using a spring, so that it no longer bridges the gap between the joint elements. It may also be possible to remove the protrusions and the force receiving element from the joint elements when no calibration is needed.

In order to avoid that the protrusions 60, 62 and 64 are destroyed by servo control errors during calibration the force receiving element 58 may have a weak point, for example at a point where it is fastened to the joint. Then it will be simple to replace the force receiving element 58 with another high precision element.

It can in this way be seen that an accurate calibration angle may be determined using only the kinematic coupling and the robot controller. Thereby the calibration angle may be determined in a precise way with a minimum of additional measuring equipment.

Now a second embodiment of the arrangement will be described. In this embodiment the same robot and robot controller is essentially used. However, the calibration control element 36 in this case has a further input being connected to a distance sensor provided together with the force receiving element 58 on the static joint element 56.

Figure 8:
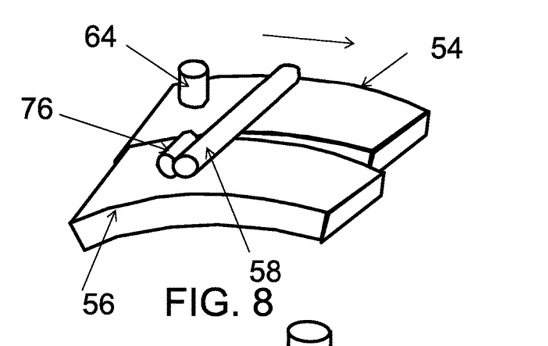
FIG. 8 shows the two joint elements and the objects of the kinematic coupling according to a second embodiment.

The force receiving element 58 is in this embodiment placed on the stationary joint element 56 in the way depicted in FIG. 8. Also in this case the holding structure is realized through the use of holding protrusions. There is here only one holding protrusion 76 on the element 56 at least partly shaped as a cylinder or rod.

Figure 9:
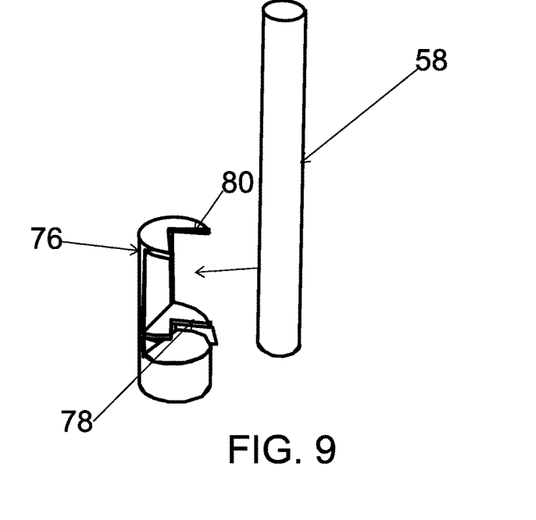
FIG. 9 shows a holding structure and the force receiving element according to the second embodiment, where two separate pairs of contact points are provided through the holding structure, FIG. 10 schematically shows the force receiving element and the holding structure with a distance sensor.

As can be seen in FIG. 9, the holding protrusion 76 does also comprise two holding elements in the form of two V-shaped holding plates 78 and 80, each providing two areas of contact with the force receiving element 58, where each area is provided as a point. However, in this case the V-shaped plates are provided in two parallel planes perpendicular to the longitudinal axis of the holding protrusion 76. Thereby each plate provides a pair of or two points of contact between the holding protrusion 76 and the force receiving element 58. Furthermore both pairs provided by the V-shaped plates are on the same side of the cylinder axis or longitudinal axis through the cylinder body of the force receiving element, where each V-shaped plate provides two laterally separated points of contact in a plane perpendicular to the longitudinal axis of the force receiving element 58.

Figure 10:
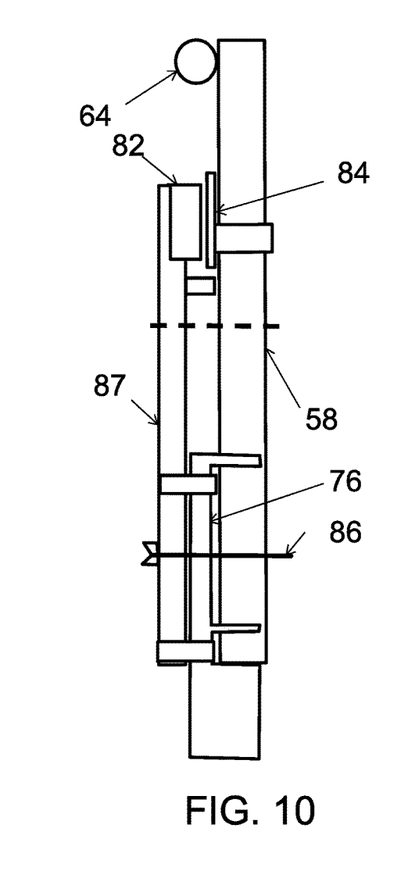

The single holding protrusion 76 and the force receiving element 58 are shown in a side view in FIG. 10 together with a distance sensor 82, which is also fastened to the holding protrusion 76 via a cylinder shaped bar 87 that stretches in parallel with the force receiving element 58. The distance sensor 82 placed on the bar 87 is aligned with a measurement marker 84 on the force receiving element 58. The distance sensor 82 is here configured to sense the distance to the measurement marker 84 on the force receiving element 58. Thereby it senses the distance to the force receiving element 58. Also here the force providing protrusion 64 is schematically indicated. The force receiving element 58 is in this case flexibly fastened to the holding protrusion 76 as well as to the cylindrical bar 87 using a first elastic holding element 86, like an elastic band or a spring, which allows the force receiving element 58 to be displaced from the distance sensor 82. The distance sensor 82 is in this case the sensor to which the further input of the calibration control element 36 is connected.

Figure 11:
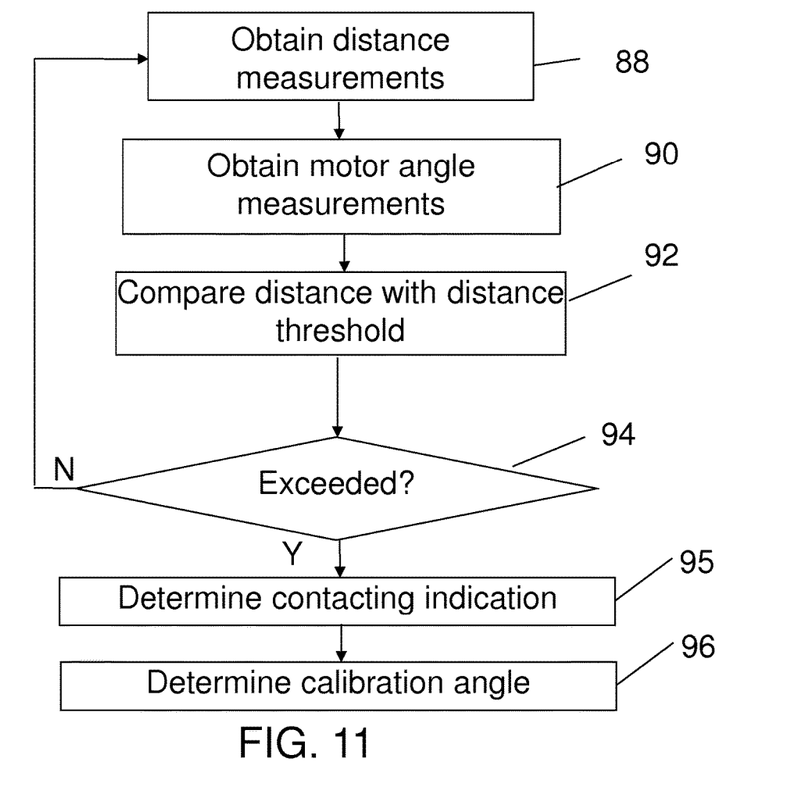
FIG. 11 shows a number of method steps in a method for determining calibration position according to the second embodiment.

The operation of this second embodiment will now be described in more detail with reference being made to FIG. 11, which shows a flow chart of method steps in a method of determining a calibration position.

The calibration according to the second embodiment may be performed using either normal control or soft servo control.

From FIG. 10 it can be seen that the position of the force receiving element 58 in relation to the position detector 82 will be constant as long as there is no contact between the force providing protrusion 64 and the force receiving element 58. However once there is contact, the force receiving element 58 and the distance marker 84 will move away from the position detector 82.

In this embodiment position commands Pref may be continuously provided by the calibration control element 36 for controlling the motor 22. At the same time the sensor handling element 38 continuously provides motor angle measurements and the distance sensor distance measurements to the calibration control element 36. This means that the calibration control element 36 obtains distance data or distance measurements from the distance sensor 82, step 88, and motor angle measurements from the sensor 48, step 90. These measurements are furthermore stored in the memory of the calibration control element 36. As this is done the calibration control element 36 may compare received position measurements, corresponding to the distances between the detector 82 and marker 84, with a distance threshold, step 92. The distance threshold may be set for guaranteeing a clear detection of distance change while avoiding a destroying of the spring that holds the force receiving element 58. As long as the distance of the distance measurements is below the distance threshold, step 94, the calibration control element 36 continues controlling the motor 22, obtaining distance measurements, step 88, and motor angle measurements, step 90. However, if the distance threshold is exceeded, step 94, then the calibration control element 36 analyses the distance measurements and motor angle measurements in order to determine a contacting indication, step 95.

The analysis of the distance measurements from of the distance sensor 82 may be made jointly with analysis of the motor angle measurements from the motor angle sensor 48 in order to identify a point at which the movement of the force receiving element 58 is started. The indication may therefore be an indication of a point in time when the distance between the force receiving element 58 and the distance sensor 82 starts to change. This may be done through analyzing a curve showing the relationship between the measured motor angles and the measured distance between the force receiving element 58 and the distance sensor 82. Thereby it is possible to detect the point of this curve where the distance measured by the distance detector 82 starts to rise. After the contacting indication has been determined, follows the determination of the calibration angle, step 96. The detected joint angle position corresponding to the point when the distance starts to rise may then be selected as the calibration angle. The calibration angle may thereby be determined as the angle of the moveable joint element at the point in time of the contacting indication.

In this way it is possible to obtain a precise determination of calibration angle without a precise angle measurement. This allows a precise determination of calibration angle to be made in a fast way. The detecting of the contacting of the force receiving element is then not necessary.

Figures 12, 13:
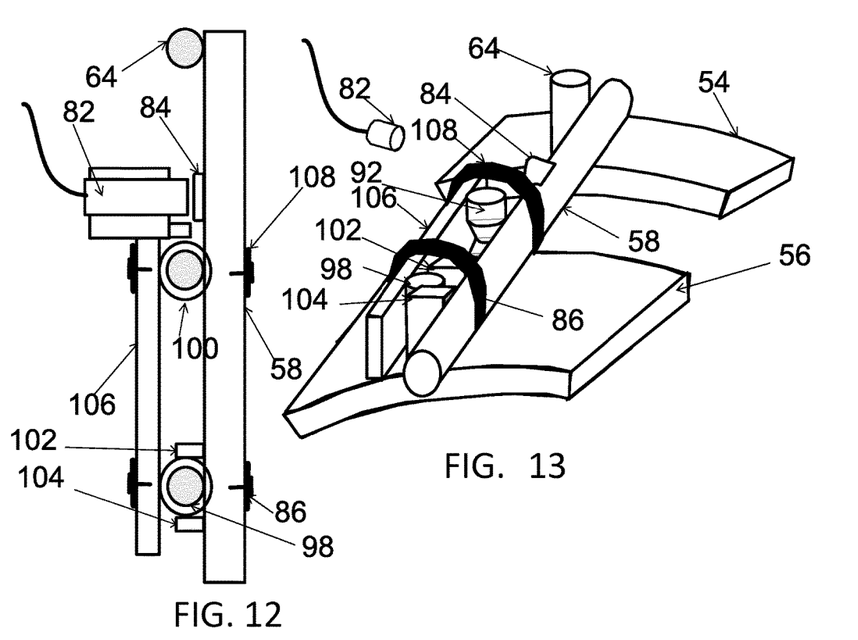
FIG. 12 shows a side view of the force receiving element, the holding structure and distance sensor in a variation of the second embodiment.
FIG. 13 shows a perspective view of the objects in FIG. 12 together with the stationary and moveable joint elements, FIG. 14 schematically shows one holding structure variation, and FIG. 15 schematically shows another holding structure variation.

One variation of the second embodiment that addresses the robustness of the kinematic coupling of the holding protrusion 76 is shown in FIGS. 12 and 13, where FIG. 12 shows a side view of the force receiving element, the holding structure and distance sensor and FIG. 13 shows a perspective view of the same objects together with the stationary and moveable joint elements.

In this variation the holding structure comprises two cylindrically shaped bars 98 and 100 stretching out radially from the static joint element 56. The bar 106 carrying the sensor 82 is furthermore flat (has a rectangular cross-section) and is at a lower end joined with the lower bar 98 of the holding structure and the force receiving element 58 using the first elastic holding element 86 and at an upper end, adjacent the sensor, joined with the upper bar 100 of the holding structure and the force receiving element using a second elastic holding element 108, which may also be an elastic band or a spring. Furthermore, in this case two further flat bars 102 and 104 are provided on opposite sides of the lower bar 98 along the longitudinal axis of the bar 98. Here the bars 102 and 104 are used to define the length of the force receiving element.

There are a number of further variations that are possible in addition to those already mentioned.

In all described embodiments and variations, it is for instance possible to place the force receiving element so that it stretches radially out from a joint element and place the force providing protrusion so that it extends across the gap between the two joint elements in parallel with the rotational axis. Alternatively it is possible that both the force providing protrusion and the force receiving element have the same orientation, i.e. that the both stretch out radially from the respective joint elements or in parallel with the axis of rotation. However, in both cases there is an overlap in the axial direction.

Furthermore, the holding structure is not limited to using protrusions. It is also possible to provide the holding structure in all the above embodiment and variations using a recess or cavity, into which the force receiving element may be placed.

Figure 14:
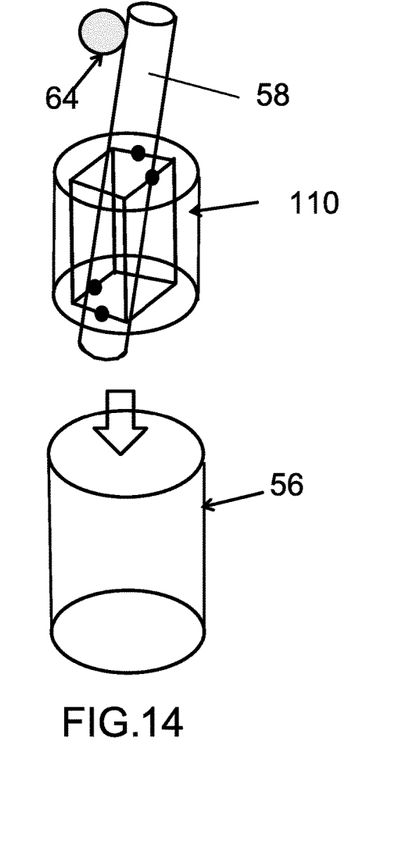
Figure 15:
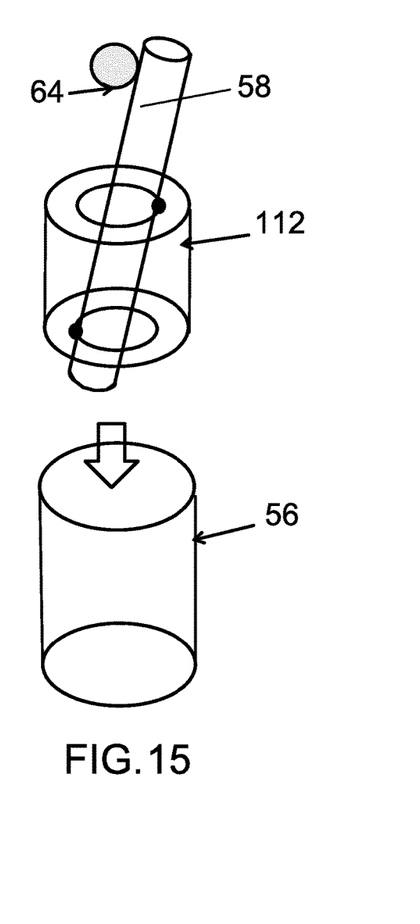

FIGS. 14 and 15 show two holding structure variations for the force receiving element that are based on cavities.

In both these variations, the force receiving element 58 is inserted in an insert element having an inner cavity. The insert element also has an exterior, which has a shape adapted to a hole provided in the joint part 56. In FIG. 14, the cavity of the insert element 110 has a rectangular cross-section, while in FIG. 15 the cavity of the insert element 112 has a circular cross-section. In FIG. 14 the force receiving element 58 is in contact with the insert element 110 at four contact points, while it is in contact with the insert element 112 at two contact points in FIG. 15.

The insert element is then inserted into the hole in the joint part 56.

Here it may also be known that instead of mounting insert elements vertically in holes they can be mounted horizontally along the joint part surface and then the joint parts can be rectangular also at the outer geometry.

The contact areas were in the above-described embodiments exemplified by contact points. It should be realized that as an alternative the areas of contact may also be well defined small contact surfaces.

In the described embodiments the force receiving element and holding protrusion(s) were placed on the static joint element with the force providing protrusion provided on the moveable joint element. It is also possible to place the force receiving element and the holding protrusion(s) on the moveable joint element and the force providing protrusion on the static joint element. The calibration control element has been described as being a part of the robot controller. It may as an alternative be provided as a separate entity that communicates with the robot controller.

The joint elements were above described in relation to rotational movement and positions in the form of angles around a rotational axis. It should be realized that the movement may in all the above-mentioned embodiments and variations also be linear and the position a distance along a linear axis. The static and moveable joint elements may for instance be provided as beamlike structures, for example using a rack and pinion transmission or a ball screw arrangement for such linear movement. In such variations the calibration position may be a linear distance between the joint elements.

The different elements of the robot controller 32 and thereby also the calibration control element 36 may be provided in the form of one or more processors together with computer program memory including computer program code for performing the functions of these elements. As an alternative they may be provided in the form of one or more Application Specific Integrated Circuits (ASIC) or Field-Programmable Gate Arrays (FPGA). This computer program code may also be provided on one or more data carriers which perform the functionality of the calibration control element when the program code thereon is being loaded in a computer forming the robot controller.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. An arrangement for determining the calibration position of a robot joint and comprising:
   the joint, comprising a moveable joint element and a stationary joint element, where one of the joint elements comprises a holding structure and the other a force providing protrusion,
   a robot controller,
   a motor connected between the robot controller and the moveable joint element, and
   a force receiving element adapted to form a kinematic coupling with the holding structure and the force providing protrusion, the kinematic coupling having at least two points of contact between the holding structure and the force receiving element and one point of contact between the force providing protrusion and the force receiving element, the force receiving element being fastenable to said holding structure for stretching out across a gap between the two robot joint elements for receiving a force from the force providing protrusion.

2. The arrangement according to claim 1, wherein the points of contact of a holding structure are provided in groups of adjacent contact points.

3. The arrangement according to claim 2, where a group consists of two points.

4. The arrangement according to claim 1, wherein the holding structure comprises an insert element having an inner cavity in which the force receiving element is inserted and an exterior with a shape adapted to a hole provided in the joint element.

5. The arrangement according to claim 1, further comprising a calibration control element configured to provide a movement command (Pref), obtain measurements relating to positions of the moveable joint element, obtain a contacting indication, indicating the force providing protrusion being in contact with the force receiving element, and determine the calibration position based on the contacting indication.

6. The arrangement according to claim 5, wherein the calibration position is a position of the moveable joint element that coincides with the contacting indication.

7. The arrangement according to claim 5, wherein the calibration position is a position of the moveable joint element that is obtained at a static state after the obtaining of the contacting indication.

8. The arrangement according to claim 5, wherein the robot controller comprises a servo element with integrating control and proportional control and the calibration control element is configured to disable integrating control.

9. The arrangement according to claim 8, wherein integrating control is disabled before the contacting indication is obtained.

10. The arrangement according to claim 8, wherein integrating control is disabled at the obtaining of the contacting indication.

11. The arrangement according to claim 5, wherein the calibration control element is configured to obtain the indication based on a detection of change in motor speed.

12. The arrangement according to claim 5, wherein the calibration control element is configured to obtain the indication based on a detection of a change in motor torque.

13. The arrangement according to claim 11, wherein the force receiving element is cylindrical with a longitudinal axis through the cylinder body and the holding structure provides two laterally separated points of contact in relation to said longitudinal axis.

14. The arrangement according to claim 5, wherein the force receiving element is flexibly fastened to the holding structure and further comprising a distance sensor connected to the holding structure and configured to sense the distance to the force receiving element, wherein the calibration control element is configured to obtain distance data from the distance sensor and determine the indication as an indication of a point in time when the distance between the force receiving element and the distance sensor starts to change and when being configured to determine the calibration position, is further configured to determine the calibration position as the position of the moveable joint element at said point in time.

15. The arrangement according to claim 14, wherein the force receiving element is cylindrical and there are two holding elements of said holding structure on the same side of a longitudinal axis through the cylinder body, each holding element providing a laterally separated point of contact in relation to said longitudinal axis.

16. A method for determining the calibration position of a robot joint comprising a moveable joint element and a stationary joint element, one of the robot joint elements comprising a holding structure fastened to a force receiving element stretching out across a gap between the two robot joint elements and the other comprising a force providing protrusion for providing a force on the force receiving element, the force receiving element being adapted to form a kinematic coupling with the holding structure and the force providing protrusion, the kinematic coupling having at least two points of contact between the holding structure and the force receiving element and one point of contact between the force providing protrusion and the force receiving element, the method being performed by a calibration control element using a robot controller and a motor connected between the robot controller and the moveable joint element, the method comprising the steps of:

provi ding a movement command;

obtaining measurements relating to positions of the moveable joint element;

obtaining a contacting indication that is an indication of the force providing protrusion contacting the force receiving element; and determining the calibration position based on the contacting indication.

17. The arrangement according to claim 12, wherein the force receiving element is cylindrical with a longitudinal axis through the cylinder body and the holding structure provides two laterally separated points of contact in relation to said longitudinal axis.

* * * * *